United States Patent
Torney

(10) Patent No.: US 8,950,005 B1
(45) Date of Patent: Feb. 3, 2015

(54) METHOD AND SYSTEM FOR PROTECTING CONTENT OF SENSITIVE WEB APPLICATIONS

(75) Inventor: Milind Torney, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 13/289,998

(22) Filed: Nov. 4, 2011

(51) Int. Cl.
*G06F 21/00* (2013.01)
*G06F 12/14* (2006.01)
*G06F 21/62* (2013.01)
*H04L 29/06* (2006.01)

(52) U.S. Cl.
CPC .............. *G06F 21/629* (2013.01); *H04L 63/20* (2013.01)
USPC .................................. 726/29; 726/1; 713/193

(58) Field of Classification Search
CPC ... H04L 63/20; H04L 63/10; H04L 2209/605; G06F 21/629; G06F 21/62; G06F 2221/2149
USPC .............. 726/1, 26, 27, 29, 30; 713/189, 193; 709/229
See application file for complete search history.

(56) References Cited

U.S. PATENT DOCUMENTS

| | | | |
|---|---|---|---|
| 7,660,880 B2 * | 2/2010 | Ting et al. ...................... | 709/223 |
| 7,991,747 B1 * | 8/2011 | Upadhyay et al. ............. | 707/674 |
| 7,996,373 B1 * | 8/2011 | Zoppas et al. ................. | 707/694 |
| 7,996,374 B1 * | 8/2011 | Jones et al. .................... | 707/694 |
| 8,141,127 B1 * | 3/2012 | Mustafa ........................... | 726/1 |
| 8,141,159 B2 * | 3/2012 | Peled et al. ..................... | 726/26 |
| 8,181,033 B1 * | 5/2012 | Paul et al. ..................... | 713/187 |
| 8,224,796 B1 * | 7/2012 | Shinde et al. ................. | 707/695 |
| 8,271,642 B1 * | 9/2012 | Sankararaman et al. ..... | 709/224 |
| 8,429,745 B1 * | 4/2013 | Casaburi et al. ............... | 726/22 |
| 8,499,152 B1 * | 7/2013 | Chen et al. .................... | 713/165 |
| 8,499,353 B2 * | 7/2013 | Lockhart et al. ............... | 726/25 |
| 2008/0209567 A1 * | 8/2008 | Lockhart et al. ............... | 726/25 |
| 2009/0328153 A1 * | 12/2009 | Chetuparambil et al. ........ | 726/4 |
| 2010/0306850 A1 * | 12/2010 | Barile et al. .................... | 726/25 |

* cited by examiner

*Primary Examiner* — Zachary A Davis
(74) *Attorney, Agent, or Firm* — Lowenstein Sandler LLP

(57) ABSTRACT

A web page running on a client computing device accesses a web application hosted by a remote server. The local application receives data from the web application. The client computing device uses a data loss prevention (DLP) policy to determine whether the web application is a sensitive web application. In response to determining that the web application is a sensitive web application, the client computing device restricts a capability of at least one of the local application or the client computing device to perform one or more operations associated with the data received from the web application.

18 Claims, 9 Drawing Sheets

METHOD AND SYSTEM FOR PROTECTING CONTENT OF SENSITIVE WEB APPLICATIONS

TECHNICAL FIELD

The methods and systems described below relate to data loss prevention. More specifically, a system and method for protecting content received from sensitive web applications are described.

BACKGROUND

Enterprises commonly provide web applications that employees are able to access via web browsers. Often these web applications have access to sensitive data, and users can easily retrieve such sensitive data by accessing the web application from a web browser. Users are often able to copy, save, print, etc. the data received by a web browser, regardless of whether this data is sensitive. Some traditional data loss prevention (DLP) systems can be used to identify and control access to sensitive data received by a web browser. However, traditional DLP systems are designed to block or record operations that would cause sensitive data to leave a computer system. Accordingly, traditional DLP systems may not identify data received by a web browser from a web application as sensitive data when the data is received. This may permit users to perform operations on sensitive data that an administrator would prefer to prevent. Additionally, detection of sensitive data by traditional DLP systems is a computationally expensive task, and can be error prone for some types of sensitive data that may be received from a web application.

SUMMARY

In one embodiment, a client computing device running a local application detects that the local application has accessed a web application hosted by a remote server and received data from the web application. The client computing device determines whether the web application is a sensitive web application using a data loss prevention (DLP) policy. In response to determining that the web application is a sensitive web application, the client computing device restricts a capability of at least one of the local application or the client computing device to perform one or more operations associated with the data received from the web application. In one embodiment, the one or more operations comprise at least one of a copy to clipboard operation, a print operation, a print screen operation, a save web page operation or a save image operation.

In one embodiment, the local application is a web browser and the received data comprises at least one of multiple cache files or a cookie associated with the web application. In such an embodiment, the client computing device restricts access to a temporary location that includes at least one of the cache files or the cookie while the web application is being accessed. The client computing device then deletes at least one of the cache files or the cookie associated with the web application after the local application terminates access to the web application.

In one embodiment, the client computing device marks the received data as sensitive data. The client computing device launches an additional local application on the client computing device and loads the received data using the additional local application. The client computing device then restricts a capability of the local application to perform the one or more operations.

In one embodiment, the DLP policy includes a listing of sensitive web applications and associated operations to restrict for those sensitive web applications. In one embodiment, determining whether the web application is a sensitive application comprises determining whether the application has a domain name, an internet protocol address or a universal resource locator that is identified in the DLP policy. In one embodiment, determining whether the web application is a sensitive application comprises identifying a network address of the web application and determining whether the network address satisfies a string matching rule included in the DLP policy.

In one embodiment, a computer readable medium includes instructions that will cause a processor that executes the instructions to detect that a local application has accessed a web application hosted by a remote server and received data from the web application. The instructions further cause the processor to determine whether the web application is a sensitive web application using a data loss prevention (DLP) policy. In response to determining that the web application is a sensitive web application, the processor restricts a capability of at least one of the local application or the client computing device to perform one or more operations associated with the data received from the web application.

In one embodiment, a method comprises detecting, by a client computing device running a local application, that the local application has accessed a web application hosted by a remote server and received data from the web application; determining, by the client computing device, whether the web application is a sensitive web application using a data loss prevention (DLP) policy; and in response to determining that the web application is a sensitive web application, restricting a capability of at least one of the local application or the client computing device to perform one or more operations associated with the data received from the web application.

BRIEF DESCRIPTION OF THE DRAWINGS

The system and methods are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
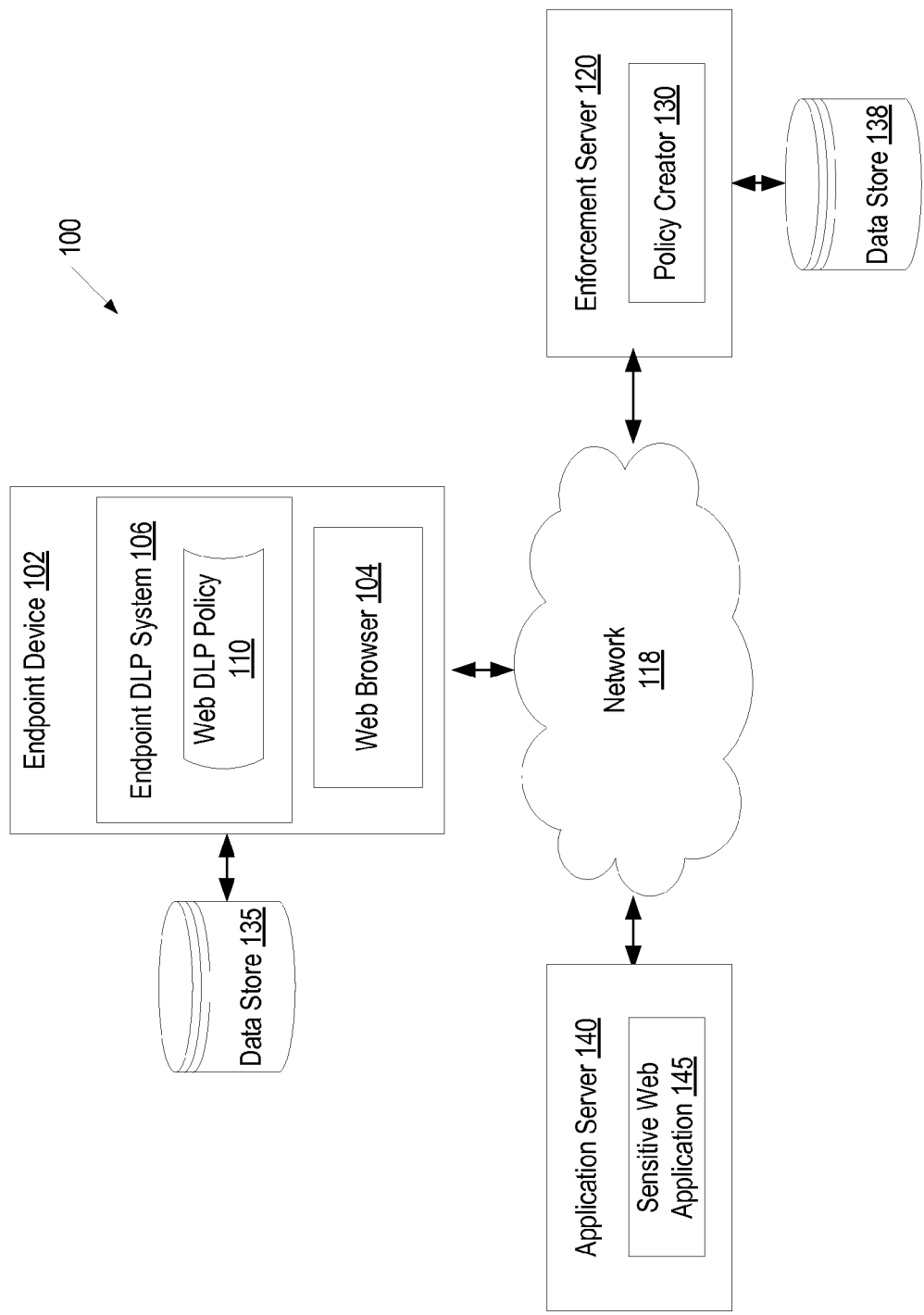
FIG. 1 illustrates an exemplary network architecture, in accordance with one embodiment of the present invention.

A system and method for protecting content of sensitive web applications are described. In one embodiment of the present invention, a local application (e.g. a web browser) running on a client computing device accesses a web application hosted by a remote server. The local application receives data from the web application. The client computing device uses a data loss prevention (DLP) policy to determine whether the web application is a sensitive web application. In one embodiment, the client computing device determines whether the web application belongs to a sensitive web application group that is protected by a DLP policy. The DLP policy may include a listing of sensitive applications along with their corresponding network addresses or components of their network addresses, which may include domain names, internet protocol (IP) addresses and/or universal resource locators (URLs). The network address of the web application may be compared to the network addresses and/or network address components in the DLP policy. If a match is identified, then it may be determined that the web application is a sensitive web application. In response to determining that the web application is a sensitive web application, the client computing device restricts a capability of the local application and/or or the client computing device to perform one or more operations associated with the data received from the web application. The one or more operations may include, for example, a copy to clipboard operation, a print operation, a print screen operation, a save web page operation and/or a save image operation.

Embodiments of the present invention protect data received from sensitive web applications. The DLP policies used in embodiments of the present invention to protect the data are computationally inexpensive, and have no chance of generating false negatives. Additionally, the DLP policies used in embodiments of the present invention protect data as soon as the data enters an endpoint device, as opposed to when the data is to leave the endpoint device. Accordingly, embodiments of the present invention provide enhanced security for data provided by web applications.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention. For example, the following description provides details for an index in an endpoint DLP system.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "accessing", "receiving", "determining", "restricting," "deleting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates an exemplary network architecture 100, in accordance with one embodiment of the present invention. The network architecture 100 includes an endpoint device 102 connected to an enforcement server 120 and an application server 140 via a network 118. The network 118 may be a private network (e.g., a local area network (LAN), wide area network (WAN), intranet, etc.), a public network (e.g., the Internet), or a combination thereof.

Enforcement sever 120 manages data loss prevention (DLP) policies. Enforcement server 120 may be a single server computing device, or may include a cluster of multiple server computing devices. Each server computing device may include one or more processing devices, memory, a data store 138, and other hardware components. A DLP policy is a data structure containing a rule or set of rules that govern the detection of sensitive data. The DLP policy may specify a particular content source or content sources to monitor, how to identify sensitive data, and/or an action to be performed when sensitive data or sensitive content sources are detected. DLP policies may also include enforcement rules. Enforcement rules specify actions for DLP systems to take when an identification rule in a DLP policy is violated. Examples of enforcement rules include rules to restrict operations, to notify an administrator of a DLP policy violation, and so on. For example, an enforcement rule may cause a DLP system to send a notification to an administrator, prevent data from exiting the endpoint device 102 through a data loss vector, lock down the endpoint device so that no data can be moved off of the endpoint device through any data loss vector, encrypt data, and/or restrict other operations.

Managing DLP policies may include generating and modifying DLP policies (e.g., based on administrator input). The enforcement server 120 may then propagate the DLP policies to the endpoint device 102 and other endpoint devices (not shown). Additionally, the enforcement server 120 may generate DLP response rules, which it may also propagate to the endpoint device 102 (either as components of a DLP policy or separately).

Enforcement server 120 includes a policy creator 130. Policy creator 130 receives an identification of sensitive web applications. A web application is an application hosted on a server (e.g., a web server) that can be accessed via a web browser or other remote application running on a client device. A sensitive web application is a web application that has access to sensitive information. In one embodiment, policy creator 130 generates sensitive web application groups based on the sensitive web applications. The sensitive web applications in a sensitive web application group may have access to the same or similar sensitive data (e.g., to the same database), or may share other characteristics such as a domain name or application type. Policy creator 130 then generates a web DLP policy 110 to protect data served by the sensitive web applications (or by sensitive web application groups), and stores the web DLP policy 110 to data store 138. DLP policies 110 may be associated with specific web applications and/or with web application groups. Policy creator 130 may also distribute the web DLP policy 110 to endpoint devices 102. The policy creator 130 is described in greater detail below with reference to FIG. 2.

Referring back to FIG. 1, each of the endpoint devices 102 may be a personal computer (PC), a laptop, a mobile phone, a tablet computer, or any other computing device. Each endpoint device 102 has multiple different data loss vectors. Each data loss vector may be a path or operation through which data can be transferred off of the endpoint device. Examples of data loss vectors include burning files to an optical disc, copying data to a portable drive (e.g., a portable universal serial bus (USB) drive), printing data to a printer, sending data through a fax, sending an email, sending an instant message, performing a print screen operation, etc. Each data loss vector may also be a mechanism that enables sensitive data to be saved, stored or otherwise retained. Examples of such data loss vectors include functions such as print, print screen, copy and paste, save page, save image, and so forth.

Endpoint device 102 includes an endpoint DLP system 106 that implements DLP policies to determine whether data is sensitive data (includes sensitive information). The endpoint device 102 runs an operating system (OS) (not shown) that manages hardware and software of the endpoint devices. The OS may be, for example, Microsoft® Windows®, Linux®, Symbian®, Apple's® OS X®, Solaris®, etc. A web browser 104 or other local application runs on top of the OS and performs various operations that involve accessing, moving, or otherwise manipulating data received from a web application 145. Web browser 104 may receive the data from the web application and store the data to a temporary location in a data store 135 included in, attached directly to, or networked with the endpoint device 102. Web browser 104 may have native support to open, read, or perform other operations on the received data. Alternatively, web browser 104 may include a plugin or extension that enables web browser 104 to read or otherwise operate on the data.

Endpoint DLP system 106 monitors data loss vectors to ensure that sensitive data (e.g., data that contains sensitive or confidential information) is protected. In one embodiment, endpoint DLP system 106 includes a web DLP policy 110 and monitors activity of web browser 104 and/or other local applications that can access remote web applications. Endpoint DLP system 106 uses the web DLP policy 110 to determine whether web applications accessed by web browser 104 (or other local applications) are sensitive web applications. In one embodiment, the endpoint DLP system uses the web DLP policy to identify a web application group that the web application belongs to. The web application group may be a set of sensitive web applications associated with a particular DLP policy. The web applications in the web application group may have access to the same or similar sensitive information and/or may share other characteristics. Accordingly, the web applications in a web application group may all be protected in a similar manner.

In response to determining that web browser 104 (or other local application) has accessed a sensitive web application 145, endpoint DLP system 106 enforces an enforcement rule or set of enforcement rules. This may include restricting the web browser 104 from performing operations such as save web page, save image, print, copy to clipboard operation, and so on. For example, the web browser 104 may be sandboxed, so that no data can escape the web browser 104. Additionally, the enforcement rules may restrict the endpoint device (e.g., the operating system running on the endpoint device 102) from performing a print screen operation, a file open operation, a file copy operation, a file move operation, or other operation. The web DLP policy 110 may protect both structured data (e.g., data stored on or extracted from a database, data from a spreadsheet, comma delimited flat files, and other data having a tabular structure) and unstructured data (e.g., files such as text files, email messages, etc.). Examples of sensitive information that may be from a sensitive web application 145 include source code, patient health information, insurance claims, product formulas, legal documents, sales and marketing reports, social security numbers, credit card numbers, etc. The endpoint DLP system 106 is described in greater detail with reference to FIG. 3.

Figure 2:
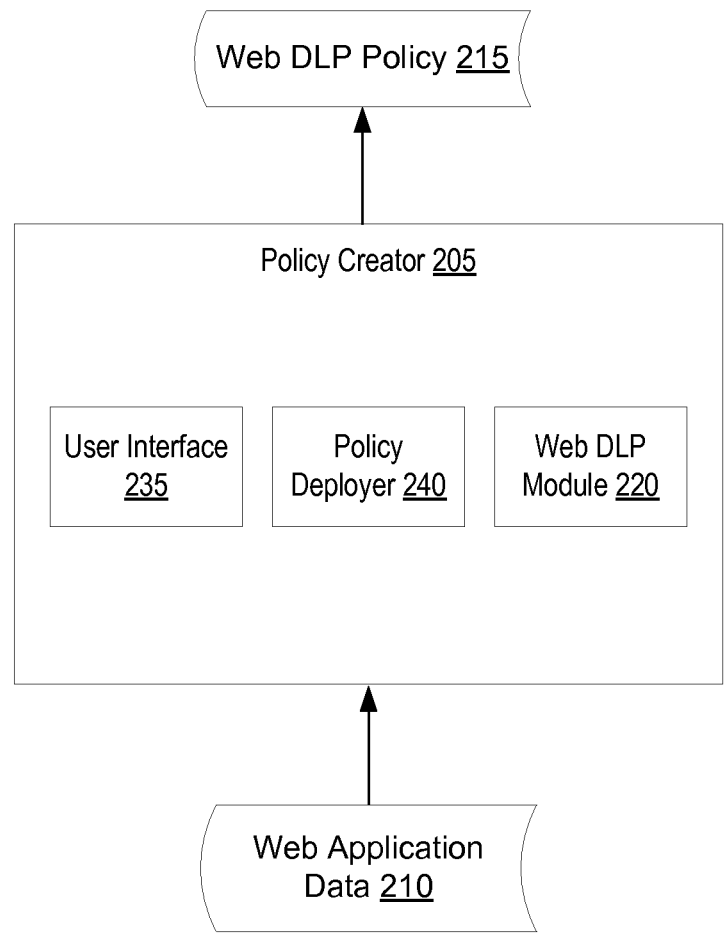
FIG. 2 is a block diagram of a policy creator, in accordance with one embodiment of the present invention.

FIG. 2 is a block diagram of a policy creator 205, in accordance with one embodiment of the present invention. In one embodiment, the policy creator 205 includes a Web DLP module 220, a user interface 235 and a policy deployer 240. Note that in alternative embodiments, one or more of the Web DLP module 220, user interface 235 and policy deployer 240 may be combined into a single module or divided into multiple modules.

User interface 235 enables a user to interact with policy creator 205. The user interface 235 may be, for example, a graphical user interface or a command line user interface. Via the user interface 235, users may select a type of DLP policy to create (e.g., an exact document matching (EDM) DLP policy, an indexed document matching (IDM) DLP policy, a described content matching (DCM) DLP policy, a machine learning based detection (MLD) DLP policy, or a web DLP policy). The user may also input data that will be used to generate the DLP policy. For example, for generation of a web DPL policy 215, a user may input web application data 210 via the user interface 235.

Web DLP module 220 generates web DLP policies 215. A web DLP policy 215 is a DLP policy configured to protect content from web applications. Each web DLP policy 215 defines a web application or set of web applications to protect as well as one or more operations to restrict while a particular protected web application is being accessed.

Web DLP module 220 receives as an input a set of web application data 210. The web application data 210 may be provided by a user via the user interface 235. Alternatively, or in addition, web application data 210 may be received as a configuration file. Web application data 210 includes information on a web application or set of web applications to protect. Each web application to protect will typically be a web application that has access to sensitive data. For example, a web application such as an online docket management system, a web based intellectual property asset management system (e.g., Foundation IP, Anaqua, Thompson IP Management), an online banking application, an online brokerage application, an insurance database application, or other type of web application that provides web based access to sensitive data may be protected.

Received information for a web application to protect may include an internet protocol (IP) address of the web application, a domain name of the web application and/or a universal resource locator (URL) or universal resources identifier (URI) of the web application. Received information for a web application may also include an operation or set of operations to restrict for that web application. In one embodiment, web application data 210 includes a web application category. Based on the provided web application category, web DLP module 220 may determine operations to restrict. Examples of web application categories include IP asset management systems, docket management systems, and so on. For example, if an IP asset management system or other application that primarily deals with confidential information is to be protected, restricted operations may include print screen, print, copy to clipboard, save image, save web page, etc. However, if a web application to be protected is a web application that only has access to a small amount of confidential information, then just operations such as copy to clipboard and save page may be restricted. Alternatively, restricted operations may be operations performed by a web browser, operations performed by an underlying operating system and/or operations performed by other applications that use data retrieved by a web browser from a sensitive web application.

Domain names, IP addresses, URIs and/or URLs for web applications included in web application data 210 may be used to generate a protected web application list. Whenever a web browser or other local application accesses a domain name, IP address and/or URL included in the protected web application list, certain operations may be restricted. Additionally, web DLP module 220 may analyze properties of identified sensitive web applications to generate a sensitive web application detection rule. For example, if multiple web applications have a URL that includes the string "patent," then web DLP module 220 may generate a string matching rule that will restrict operations whenever a URL is accessed that includes the string "patent." In one embodiment, web DLP module 220 uses vector machine learning (VML) techniques such as clustering to create DLP protection rules. Alternatively, other data analysis and/or pattern recognition techniques may be used. Users may also manually define string matching rules to use via the user interface 235.

Policy deployer 240 deploys generated DLP policies (e.g., web DLP policy 215). Deployment of a DLP policy may include downloading the DLP policy to endpoint devices. The endpoint devices may include endpoint DLP systems that implement the DLP policies.

Figure 3:
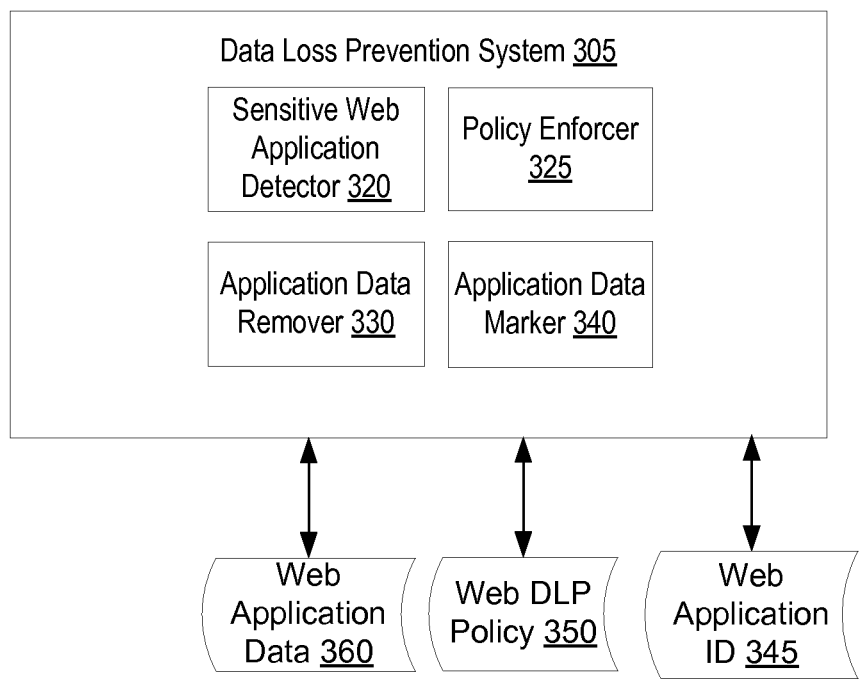
FIG. 3 is a block diagram of a data loss prevention system, in accordance with one embodiment of the present invention.

FIG. 3 is a block diagram of a data loss prevention system 305, in accordance with one embodiment of the present invention. In one embodiment, the DLP system 305 corresponds to endpoint DLP system 106 of FIG. 1. In one embodiment, DLP system 305 includes a sensitive web application detector 320, a policy enforcer 325, an application data remover 330 and an application data marker 340. In alternative embodiments, one or more of the web application detector 320, policy enforcer 325, application data remover 330 and application data marker 340 may be combined into a single module or divided into multiple modules. DLP system 305 may be implemented as a standalone application, as a plugin or extension to a web browser, or as a combination of both. For example, sensitive web application detector 320 may be a plugin to a web browser, while policy enforcer 325 is a component of a separate application. Additionally, some of the modules (or operations of some modules) may run at a kernel level, while other modules and/or operations run at a user level. For example, policy enforcer 325 may include a file system filter driver.

Data loss prevention system 305 enforces one or more DLP policies. In one embodiment, DLP system 305 enforces a web DLP policy 350. The web DLP policy 350 may be received from an enforcement server, and may be activated on or after receipt. While the web DLP policy 350 is active, sensitive web application detector 320 monitors a web browser and/or other local applications to detect accesses to sensitive web applications.

The web DLP policy 350 defines sensitive web applications. The web DLP policy 350 includes information that can be used to identify sensitive web applications, and additionally includes enforcement rules. The information for identifying sensitive web applications may include domain names, IP addresses, URIs and/or URLs of sensitive web applications. Additionally, or in the alternative, the information may include a rule or rules for identifying sensitive web applications.

When a web browser or other local application accesses a web application, sensitive web application detector 320 receives, intercepts or extracts an identifier 345 for the web application. In one embodiment, sensitive web application detector 320 is implemented as a web browser extension or plugin that can intercept URLs of accessed web sites. In another embodiment, sensitive web application detector 320 monitors network packets to determine identifiers of web applications being accessed. Other techniques may also be used for obtaining the identifier 345.

In one embodiment, the sensitive web application detector 320 uses a URL or a portion of the URL (e.g., a domain name included in the URL, a page location included in the URL, an IP address associated with the URL, etc.) for the web application as the web application's identifier 345. If the web application's identifier (e.g., the URL or a component of the URL) matches a web application identifier included in the web DLP policy 350, or if the web application's identifier satisfies a rule included in the web DLP policy 350, then sensitive web application detector 320 designates the web application as a sensitive web application. For example, web DLP policy 350 may include a rule to protect all web applications having the word "private" in the URL. Alternatively, or in addition, web application policy 350 may protect a web application having the specific URL of http://www.enterprise.com/very_private_data.html.

In one embodiment, sensitive web application detector 320 prompts a user when an attempt to access a sensitive web application is detected. The prompt may notify the user that the local application or web browser will be placed into a secure mode. While the local application or web browser is in the secure mode, certain operations may be disabled. In one embodiment, the user may be requested to confirm entry into the secure mode. If the user fails to confirm entry into the secure mode, then policy enforcer 325 may block access to the sensitive web application.

In one embodiment, when sensitive web application detector 320 detects that a web browser or other local application accesses a sensitive web application, policy enforcer 325 is invoked. Policy enforcer 325 enforces one or more enforcement rules in the web DLP policy 350. Enforcing the enforcement rules may include restricting one or more operations while there is an open connection or session with the web application. Enforcing the enforcement rules may also include monitoring particular operations, recording operations and/or reporting operations to an administrator. Web DLP policy 350 identifies which operations to restrict. Each protected sensitive web application identified in the web DLP policy 350 is associated with particular enforcement rules (e.g., a restricted operation or operations). Additionally, sensitive web application detection rules may be associated with particular enforcement rules.

Policy enforcer 325 may restrict operations of just the web browser. Alternatively, or in addition, policy enforcer 325 may restrict operations of an underlying operating system and/or of some or all additional applications.

When the web browser or other local application receives web application data 360 from the sensitive web application, that data 360 may be placed into a temporary location (e.g., a temporary internet cache). Received data 360 may include cookies, images, documents, and/or other files. In one embodiment, policy enforcer 325 prevents access to the temporary location while the web application is being accessed by the web browser or other local application (e.g., while a session and/or connection are maintained with the web application). Alternatively, policy enforcer 325 may allow limited access to the data 360. For example, policy enforcer 325 may enable a specific application or applications to load web application data 360.

In one embodiment, policy enforcer 325 includes a file system filter driver. Policy enforcer 325 may keep track of all web application data 360. The file system filter driver may intercept all file commands, and determine whether the command will cause an operation to be performed on any portion of the web application data 360. Those commands that will cause an operation to be performed on web application data (e.g., a read operation, a copy operation, a move operation, etc.) may be prevented. In another embodiment, policy enforcer 325 may monitor file system calls by using API hooking. In these embodiments, access may be granted to the temporary location while there is a connection or session with the web application. This may be useful if the temporary location stores data from other web pages in addition to web application data 360 from sensitive web applications.

In addition to detecting when a local application gains access to a sensitive web application, sensitive web application detector 320 may also detect when the web application loses access to the sensitive web application (e.g., when a connection with the sensitive web application is terminated). When sensitive web application detector 320 determines that the web browser is no longer connected to the web application (e.g., a session has terminated), application data remover 330 may delete web application data 360 that had been received from the sensitive web application. This may further safeguard any sensitive data from the sensitive web application. Examples of data that may be deleted include cookies, temporary internet files, and so on.

In one embodiment, application data marker 340 marks web application data 360 as sensitive data. In this embodiment, the web application data 360 may not be immediately deleted in response to the web application losing access to the sensitive web application. Data 360 that is marked as sensitive data may be protected externally from the web browser or other local application. For example, if the marked application data 360 is loaded using an additional application (e.g., a word processor), policy enforcer 325 may prevent that word processor from performing operations such as save, print, copy to clipboard, etc. This may provide flexibility in handling and processing web application data 360 without sacrificing security.

Figure 4:
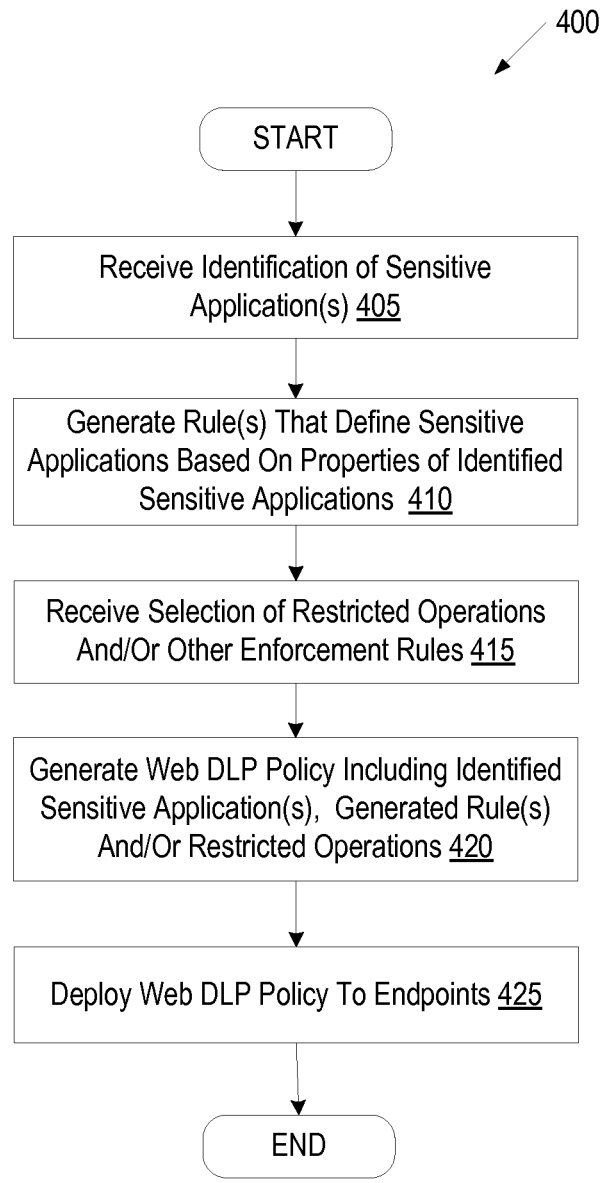
FIG. 4 is a flow diagram illustrating one embodiment for a method of generating a data loss prevention policy to protect content from a sensitive web application.

FIG. 4 is a flow diagram illustrating one embodiment for a method 400 of generating a web DLP policy for protecting content from sensitive web applications. The method 400 is performed by processing logic that may comprise hardware (circuitry, dedicated logic, etc.), software (such as is run on a general purpose computer system or a dedicated machine), or a combination of both. Method 400 may be performed by a policy creator such as policy creator 130 running on enforcement server 120 of FIG. 1.

Referring to FIG. 4, at block 405 processing logic receives identification of a sensitive application or multiple sensitive applications. The sensitive applications may be web applications that have access to confidential information or other sensitive information. The received identification may include a URL, a universal resource identifier (URI), a domain name, an IP address and/or a page location for the sensitive application or sensitive applications.

At block 410, processing logic generates an identification rule or set of identification rules that define sensitive applications based on properties of the identified sensitive applications. In one embodiment, processing logic generates a sensitive web application list. Each entry in the sensitive web application list may include a URI, URL, domain name, etc. of an identified sensitive application. The generated rule or rules may cause a DLP system to restrict operations when a web browser accesses any of the web applications included in the sensitive web application list.

In one embodiment, processing logic generates one or more string matching rules based on the received identification of sensitive applications. For example, if multiple identified sensitive applications all have similar terms in their URLs (e.g., secure), then a string matching rule may be generated that can be used to check whether future accessed web pages have the similar terms in their URLs. Each time a web browser accesses a web site, the URL for the web site may be analyzed using the string matching rules. If the URL satisfies a string matching rule, then the web application associated with the current URL may be identified as a sensitive web application.

At block 415, processing logic receives selection of restricted operations. A user may select operations to restrict for each individual rule or entry in a sensitive web application list. Alternatively, a user may select one or more operations to restrict for all sensitive web applications, or for a group of sensitive web applications. In an alternative embodiment, processing logic automatically assigns a restricted operation or set of restricted operations to each sensitive application or rule. Automatic assignment of restricted operations may be based on web application type, contents of web applications, URLs of web applications, and/or other information. In one embodiment, processing logic maintains a repository that contains information on various web applications. The repository may include information about types of data that is accessible to particular web applications, categories of web applications, and/or other information. Data in the repository may be used to perform automatic assignment of restricted operations to sensitive web applications. In addition to, or instead of, determining restricted operations, processing logic may determine other enforcement rules such as monitoring rules or reporting rules to apply for specific sensitive web applications.

At block 420, processing logic generates a web DLP policy that includes the identified sensitive applications, the generated identification rules and/or the enforcement rules (e.g., restricted operations). At block 425, processing logic deploys the web DLP policy to endpoints. Deployment of the web DLP policy may include downloading the web DLP policy to the endpoints and directing endpoint DLP systems to activate the web DLP policy.

Figure 5A:
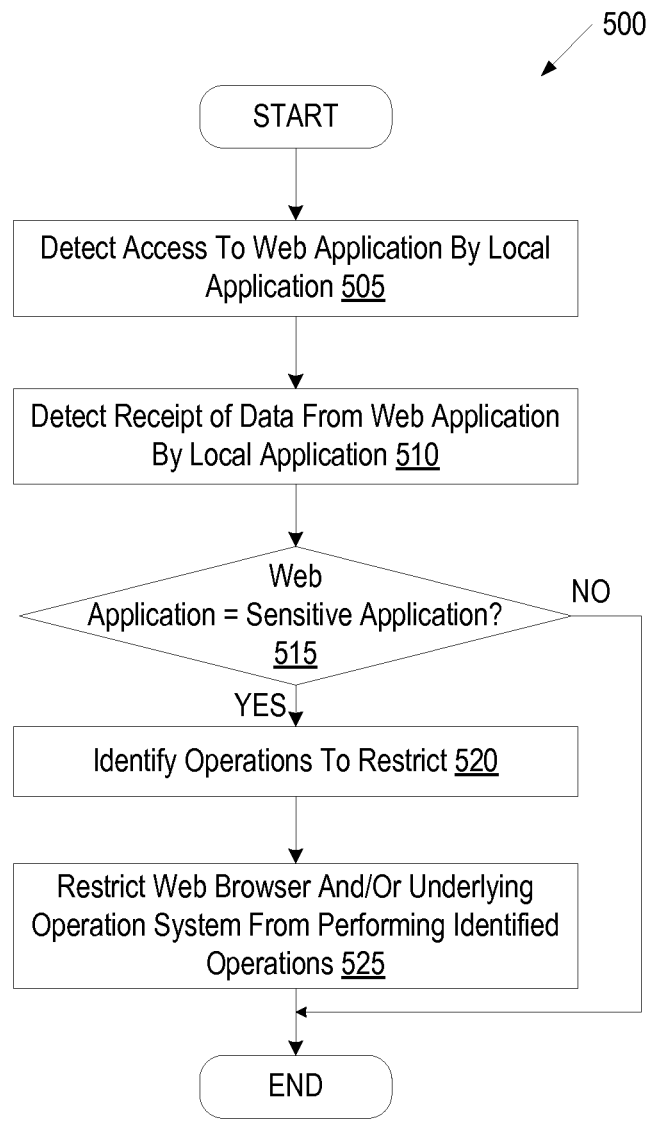
FIG. 5A is a flow diagram illustrating one embodiment for a method of protecting content from a sensitive web application.

FIG. 5A is a flow diagram illustrating one embodiment for a method 500 of protecting content from a sensitive web application. The method 500 is performed by processing logic that may comprise hardware (circuitry, dedicated logic, etc.), software (such as is run on a general purpose computer system or a dedicated machine), or a combination of both. Method 500 may be performed by a data loss prevention (DLP) system, such as endpoint DLP system 106 running on endpoint device 102 of FIG. 1.

Figure 5B:
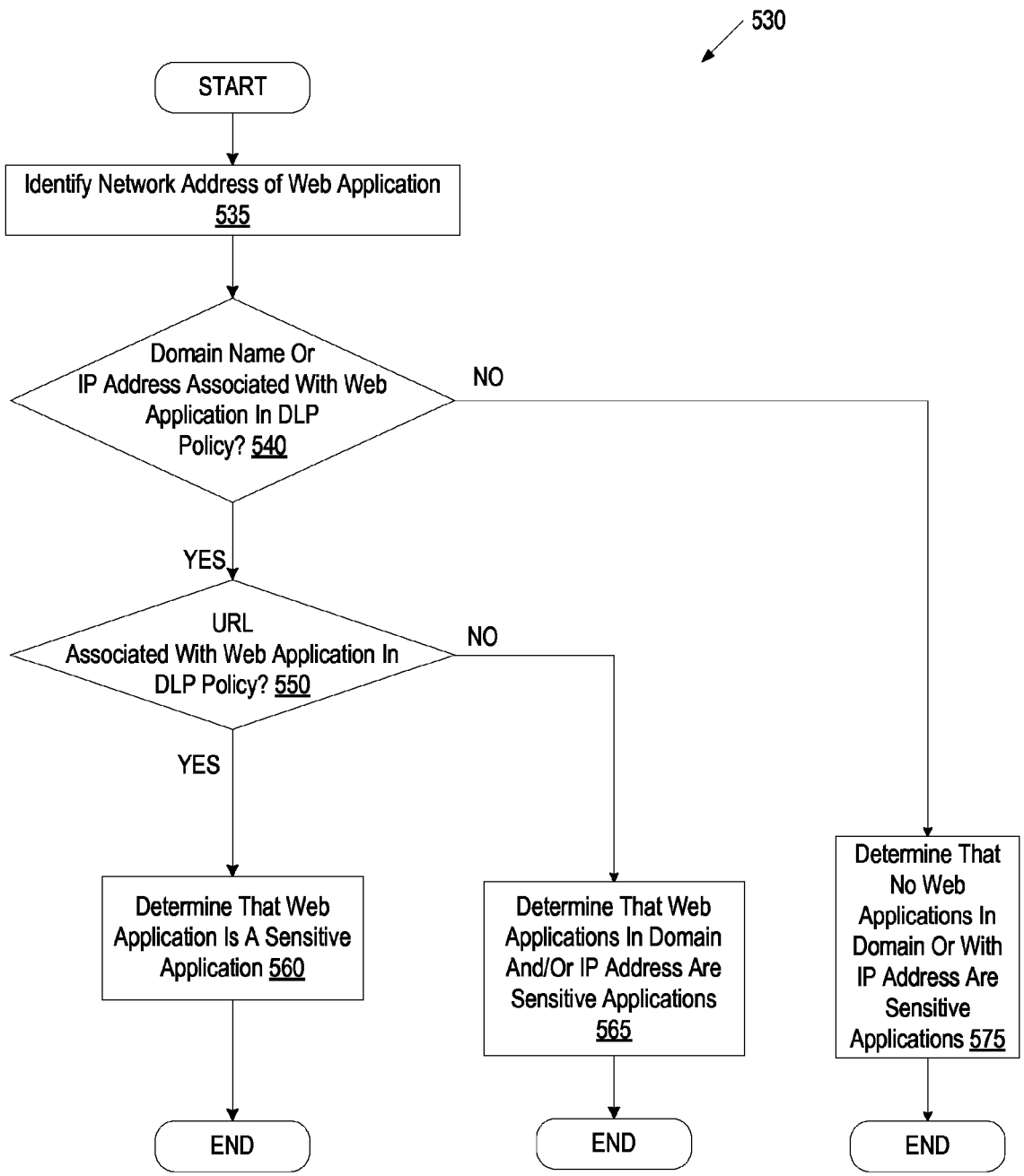
FIG. 5B is a flow diagram illustrating one embodiment for a method of determining whether a web application is a sensitive web application.

At block 505 of method 500, processing logic detects that a local application (e.g., a web browser) has requested access to or is accessing a web application. At block 510, processing logic detects that the web browser receives data from the web application. At block 515, processing logic determines whether the web application is a sensitive web application. Processing logic may use a sensitive web application list and/or a sensitive web application identification rule or rules to make the determination. In one embodiment, method 530 of FIG. 5B is performed at block 515 to identify whether the web application is a sensitive web application. If the web application is a sensitive web application, the method proceeds to block 520. Otherwise, the method ends.

At block 520, processing logic identifies an operation or set of operations to restrict. Examples of operations that may be restricted include a print operation, print screen operation, copy to clipboard operation, save image operation, save page operation, and so on. Processing logic may additionally or alternatively identify other enforcement actions to perform, such as monitoring, recording or reporting specific operations. At block 525, processing logic restricts the web browser and/or an underlying operating system from performing the restricted operations while the web browser accesses the sensitive web application. Processing logic may additionally restrict other applications from performing restricted operations on data received by the web browser from the sensitive web application. Note that in one embodiment, the operation of block 510 is performed after block 520 rather than after block 505. For example, processing logic may determine what operations will be restricted for data received from a sensitive web application before such data is received.

FIG. 5B is a flow diagram illustrating one embodiment for a method 530 of determining whether a web application is a sensitive web application. The method 530 is performed by processing logic that may comprise hardware (circuitry, dedicated logic, etc.), software (such as is run on a general purpose computer system or a dedicated machine), or a combination of both. Method 530 may be performed by a data loss prevention (DLP) system, such as endpoint DLP system 106 running on endpoint device 102 of FIG. 1. In one embodiment, method 530 is performed at block 515 of method 500.

At block 535 of method 530, processing logic identifies a network address of a web application that has been accessed by a web browser. The network address may include, for example, a URI or URL for the web application. At block 540, processing logic determines whether a domain name associated with the web application (e.g., included in the network address of the web application) is identified in a DLP policy. The domain name may be identified in the DLP policy, for example, if the domain name is included in a list of URLs or domain names, or if the domain name satisfies a sensitive web application rule. Processing logic may also or instead determine whether an internet protocol (IP) address associated with the web application (e.g., included in or based on the network address of the web application) is in the DLP policy. The IP address may be identified in the DLP policy, for example, if the web application's domain name or URL translates to an IP address that is included in a list of IP addresses in the DLP policy, or if the address satisfies a sensitive web application identification rule. If the web application's domain name or IP address is identified in the DLP policy, the method continues to block 550. Otherwise, the method continues to block 575.

At block 575, processing logic determines that no web applications in the domain associated with the web application or having the having the IP address are sensitive applications. Accordingly, processing logic will not restrict any operations based on a web browser accessing the web application.

At block 550, processing logic determines whether the web application's URL or URI is associated with a DLP policy. The URL may be identified in the DLP policy, for example, if the web application's whole URL is included in a list of URLs in the DLP policy, or if the URL satisfies a sensitive web application identification rule. Note that in some embodiments the operations of block 540 or the operations of block 550 may be skipped. The operations of 540 or the operations of 550 may be sufficient on their own to identify a web application. If the web application's URL is identified in the DLP policy, the method continues to block 560. Otherwise, the method continues to block 565.

At block 560, processing logic determines that the web application is a sensitive web application. Processing logic may also determine that other applications having the same domain name or IP address as the web application are not sensitive web applications.

At block 565, processing logic determines that the web application is a sensitive web application and that other web applications having the web application's domain or IP address are also sensitive applications.

Note that in alternative embodiments to those illustrated in FIG. 5B, a web application's domain name, IP address, URI and/or URL may be checked independently of one another. For example, a check on the web application's URL may be independent of whether the web application has a domain name or IP address that is identified in a DLP policy.

Figure 6:
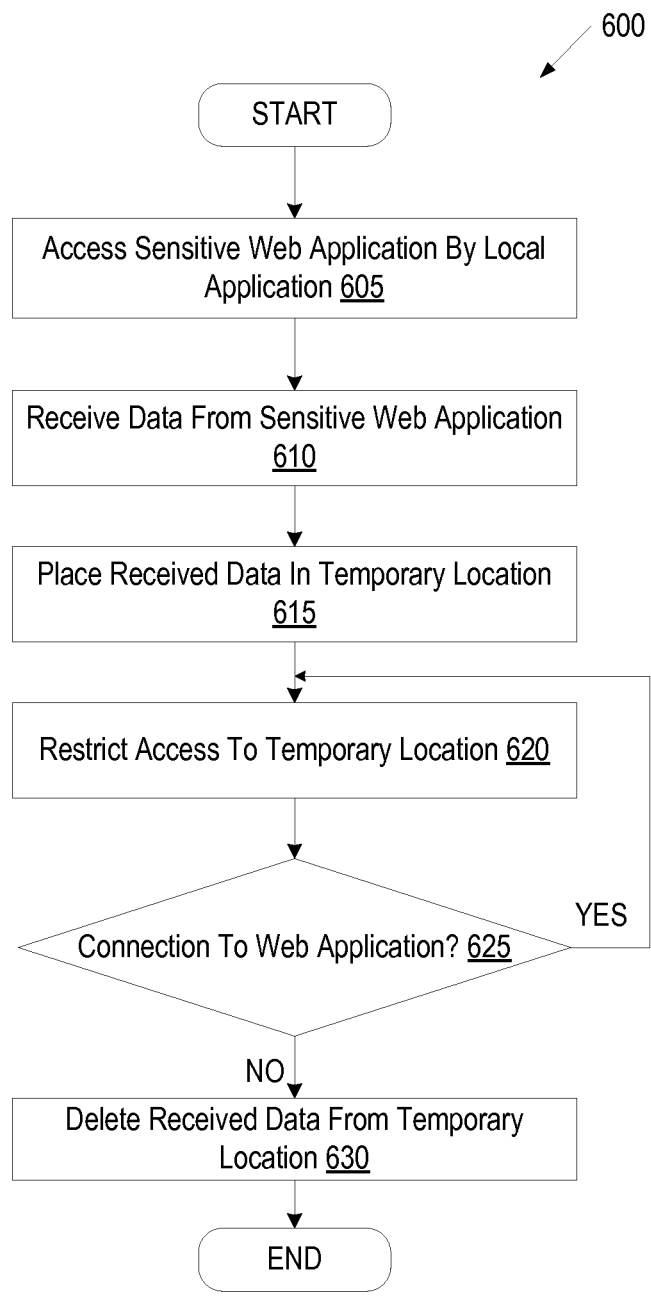
FIG. 6 is a flow diagram illustrating another embodiment for a method of protecting content from a sensitive web application.

FIG. 6 is a flow diagram illustrating another embodiment for a method 600 of protecting content from a sensitive web application. The method 600 is performed by processing logic that may comprise hardware (circuitry, dedicated logic, etc.), software (such as is run on a general purpose computer system or a dedicated machine), or a combination of both. Method 600 may be performed by a data loss prevention (DLP) system, such as endpoint DLP system 106 running on endpoint device 102 of FIG. 1.

At block 605 of method 600, a web browser or other local application accesses a sensitive web application. The web application may be identified as a sensitive web application as recited in methods 500 and/or 530. Alternatively, other techniques may be used to identify the web application as a sensitive web application. At block 610, the web browser or other local application receives data from the sensitive web application.

At block 615, processing logic places the received data in a temporary location. Processing logic may place different received data in different temporary locations based on the type of data received. For example, received images, documents, html pages, etc. may be placed in a temporary browser cache, while received cookies may be placed in a cookie folder.

At block 620, processing logic restricts access to the temporary location (or locations). Restricting the access may include restricting a capability to view contents of the temporary location and/or restricting one or more operations on files contained in the temporary location. For example, read operations, write operations, delete operations, etc. may be restricted for contents of the temporary location. In one embodiment, access to files in the temporary location is restricted on an application by application basis. For example, a web browser may be granted access to files in the temporary location, but all other applications may be prohibited from accessing the temporary location or its contents.

At block 625, processing logic determines whether the local application has a connection or session established with the web application (e.g., if a session has expired). In one embodiment, a web browser is considered to have a connection to a web application if the web browser has an open browser window that has navigated to a URL of the web application. If the web browser has a connection to the web application, the method returns to block 620. If the web browser ceases to access the web application (e.g., a session to the web application expires or a browser window to the web application closes), the method continues to block 630.

At block 630, processing logic deletes the received data from the temporary location. Therefore, there may be no risk of the data being compromised.

Figure 7:
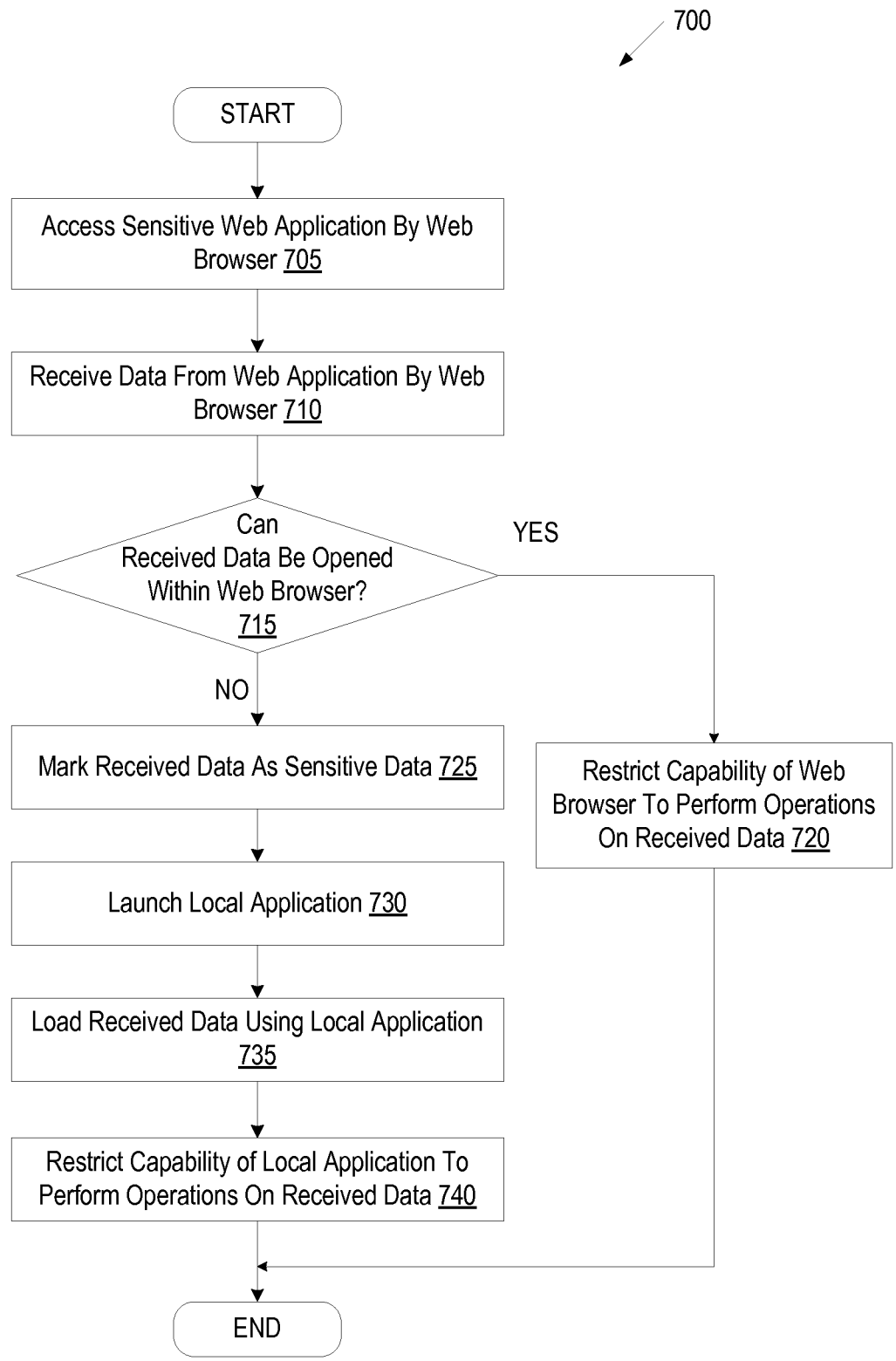
FIG. 7 is a flow diagram illustrating yet another embodiment for a method of protecting content from a sensitive web application.

FIG. 7 is a flow diagram illustrating yet another embodiment for a method 700 of protecting content from a sensitive web application. The method 700 is performed by processing logic that may comprise hardware (circuitry, dedicated logic, etc.), software (such as is run on a general purpose computer system or a dedicated machine), or a combination of both. Method 700 may be performed by a data loss prevention (DLP) system, such as endpoint DLP system 106 running on endpoint device 102 of FIG. 1.

At block 705 of method 700, a web browser accesses a sensitive web application. The web application may be identified as a sensitive web application as recited in methods 500 and/or 530. Alternatively, other techniques may be used to identify the web application as a sensitive web application. At block 710, the web browser receives data from the sensitive web application.

At block 715, processing logic determines whether the received data can be opened (e.g., is readable) by the web browser. If the received data is not readable by the web browser, the method continues to block 725. If the received data is readable by the web browser, the method proceeds to block 720.

At block 720, processing logic restricts a capability of the web browser to perform operations on the received data.

At block 725, processing logic marks the received data as sensitive data. This may include adding metadata to the received data (e.g., a flag or other indicator that identifies the data as being sensitive data). Alternatively, processing logic may maintain a sensitive data list, table or other data structure, and may add an entry to the data structure for the received data. Accordingly, in some embodiments the data itself remains unmodified.

At block 730, processing logic launches a local application that is capable of reading or loading the received data. At block 735, processing logic loads the received data using the local application. For example, received data may include a spreadsheet that is not readable by the web browser. In such an instance, processing logic may determine that the spreadsheet is readable by Microsoft Excel, may launch Microsoft Excel, and may cause Microsoft Excel to open the received spreadsheet.

At block 740, processing logic restricts a capability of the local application to perform operations on the received data. For example, the local application may be prevented from printing the data, modifying the data, copying the data to a clipboard, and/or performing other operations on the data. The method then ends.

Figure 8:
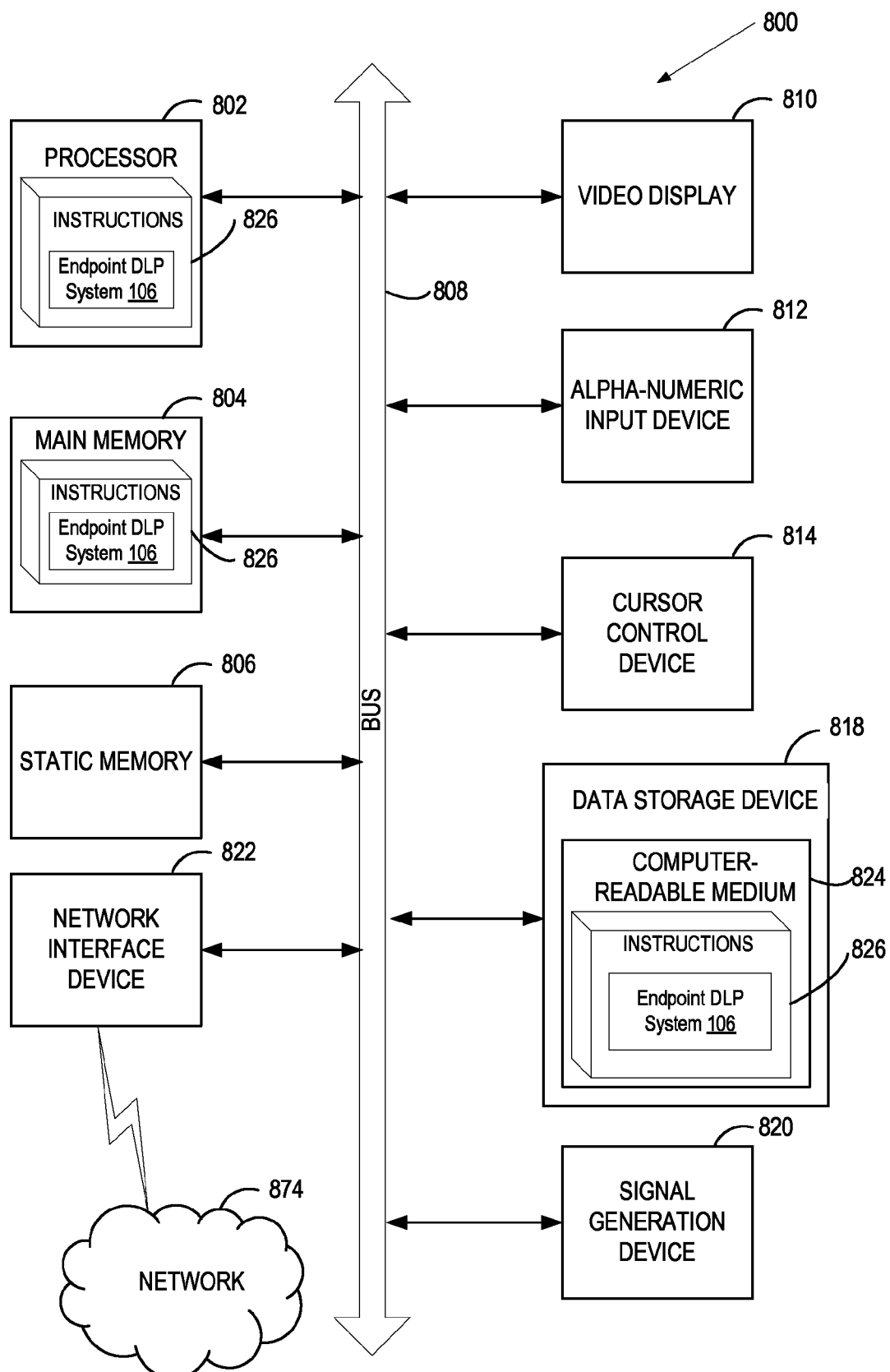
FIG. 8 is a block diagram of an exemplary computer system that may perform one or more of the operations described herein.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one embodiment, the instructions 826 include instructions for a DLP system that enforces a web DLP policy (e.g., such as DLP system 205 of FIG. 2) and/or a software library containing methods that call such a DLP system. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, by a client computing device running a local application, that the local application has accessed a web application hosted by a remote server and received data from the web application, wherein the detecting comprises intercepting universal resource identifiers (URIs) or universal resource locators (URLs) used by the local application to detect that the local application has accessed the web application;
   determining, by the client computing device, whether the web application is a sensitive web application identified by a data loss prevention (DLP) policy, wherein the sensitive web application has access to sensitive information identified by and protected by the DLP policy, wherein the DLP policy comprises a set of identifiers of a set of web applications to protect and a set of one or more operations to restrict for the set of web applications, wherein the determining comprises:
      comparing the URIs or URLs against the set of identifiers specified in the DLP policy; and
      identifying the web application as a sensitive web application when the respective URI or URL matches one of the set of identifiers specified in the DLP policy; and
   in response to determining that the web application is a sensitive web application identified by the DLP policy, restricting a capability of at least one of the local application or the client computing device to perform the set of one or more operations on the data received from the web application.

2. The method of claim 1, wherein the set of one or more operations comprise at least one of a copy to clipboard operation, a print operation, a print screen operation, a save web page operation or a save image operation.

3. The method of claim 1, wherein the local application is a web browser and the received data comprises at least one of a plurality of cache files or a cookie associated with the web application, the method further comprising:
   restricting access to a temporary location that includes at least one of the plurality of cache files or the cookie while the web application is being accessed; and
   deleting at least one of the plurality of cache files or the cookie associated with the web application after the local application terminates access to the web application.

4. The method of claim 1, further comprising:
   marking the received data as sensitive data;
   launching an additional local application on the client computing device;
   loading the received data using the additional local application; and
   restricting a capability of the additional local application to perform the set of one or more operations.

5. The method of claim 1, wherein determining whether the web application is the sensitive application further comprises determining whether the web application has a domain name, an internet protocol address or a universal resource locator that is identified in the set of identifiers of the DLP policy.

6. The method of claim 1, wherein determining whether the web application is the sensitive application further comprises:
   identifying a network address of the web application; and
   determining whether the network address satisfies a string matching rule included in the DLP policy.

7. An endpoint device comprising:
   a memory to store instructions for a data loss prevention (DLP) policy; and
   a processing device coupled with the memory, wherein the processing device is configured to:
      access a web application, hosted by a remote server, using a local application that uses a universal resource identifier (URI) or universal resource locator (URL) to access the web application;
      receive data from the web application using the local application;
      determine whether the web application is a sensitive web application identified by the DLP policy, wherein the sensitive web application has access to sensitive information identified by and protected by the DLP policy, wherein the DLP policy comprises a set of identifiers of a set of web applications to protect and a set of one or more operations to restrict for the set of web applications, wherein the processing device is further configured to:
         compare the URI or URL against the set of identifiers specified in the DLP policy; and
         identify the web application as a sensitive web application when the URI or URL matches one of the set of identifiers specified in the DLP policy; and
      in response to determining that the web application is a sensitive web application identified by the DLP policy, restrict a capability of at least one of the local application or the endpoint device to perform the set of one or more operations on the data received from the web application.

8. The endpoint device of claim 7, wherein the set of one or more operations comprise at least one of a copy to clipboard operation, a print operation, a print screen operation, a save web page operation or a save image operation.

9. The endpoint device of claim 7, wherein the local application is a web browser and the received data comprises at least one of a plurality of cache files or a cookie associated with the web application, and wherein the processing device is further configured to:
   restrict access to a temporary location that includes at least one of the plurality of cache files or the cookie while the web application is being accessed; and delete at least one of the plurality of cache files or the cookie associated with the web application after the local application terminates access to the web application.

10. The endpoint device of claim 7, wherein the processing device is further configured to:
  mark the received data as sensitive data;
  launch an additional local application on the client computing device;
  load the received data using the additional local application; and
  restrict a capability of the additional local application to perform the set of one or more operations.

11. The endpoint device of claim 7, wherein determining whether the web application is the sensitive application further comprises determining whether the web application has a domain name, an internet protocol address or a universal resource locator that is identified in the set of identifiers of the DLP policy.

12. The endpoint device of claim 7, wherein determining whether the web application is the sensitive application further comprises:
  identifying a network address of the web application; and
  determining whether the network address satisfies a string matching rule included in the DLP policy.

13. A non-transitory computer readable storage medium including instructions that, when executed by a processing device, cause the processing device to perform operations comprising:
  detecting, by a client computing device running a local application, that the local application has accessed a web application hosted by a remote server and received data from the web application, wherein the detecting comprises intercepting universal resource identifiers (URIs) or universal resource locators (URLs) used by the local application to detect that the local application has accessed the web application;
  determining, by the client computing device, whether the web application is a sensitive web application identified by a data loss prevention (DLP) policy, wherein the sensitive web application has access to sensitive information identified by and protected by the DLP wherein the DLP policy comprises a set of identifiers of a set of web applications to protect and a set of one or more operations to restrict for the set of web applications, wherein the determining comprises:
    comparing the URIs or URLs against the set of identifiers specified in the DLP policy; and
    identifying the web application as a sensitive web application when the respective URI or URL matches one of the set of identifiers specified in the DLP policy; and
  in response to determining that the web application is a sensitive web application identified by the DLP policy, restricting a capability of at least one of the local application or the client computing device to perform the set of one or more operations on the data received from the web application.

14. The non-transitory computer readable storage medium of claim 13, wherein the set of one or more operations comprise at least one of a copy to clipboard operation, a print operation, a print screen operation, a save web page operation or a save image operation.

15. The non-transitory computer readable storage medium of claim 13, wherein the local application is a web browser and the received data comprises at least one of a plurality of cache files or a cookie associated with the web application, the operations further comprising:
  restricting access to a temporary location that includes at least one of the plurality of cache files or the cookie while the web application is being accessed; and
  deleting at least one of the plurality of cache files or the cookie associated with the web application after the local application terminates access to the web application.

16. The non-transitory computer readable storage medium of claim 13, the operations further comprising:
  marking the received data as sensitive data;
  launching an additional local application on the client computing device;
  loading the received data using the additional local application; and
  restricting a capability of the additional local application to perform the set of one or more operations.

17. The non-transitory computer readable storage medium of claim 13, wherein determining whether the web application is the sensitive application further comprises determining whether the web application has a domain name, an internet protocol address or a universal resource locator that is identified in the set of identifiers of the DLP policy.

18. The non-transitory computer readable storage medium of claim 13, and wherein determining whether the web application is the sensitive application further comprises:
  identifying a network address of the web application; and
  determining whether the network address satisfies a string matching rule included in the DLP policy.

* * * * *